US012726359B2

(12) United States Patent
Goodman et al.

(10) Patent No.: US 12,726,359 B2
(45) Date of Patent: Sep. 1, 2026

(54) SYSTEM AND METHOD FOR PROVIDING INFORMATION USABLE TO IDENTIFY TRUST IN DATA

(71) Applicant: Dell Products L.P., Round Rock, TX (US)

(72) Inventors: Bradley K. Goodman, Nashua, NH (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 18/301,640

(22) Filed: Apr. 17, 2023

(65) Prior Publication Data

US 2024/0348454 A1 Oct. 17, 2024

(51) Int. Cl.

| | |
|---|---|
| ***H04L 29/06*** | (2006.01) |
| ***G06Q 10/0639*** | (2023.01) |
| ***H04L 9/08*** | (2006.01) |
| ***H04L 9/32*** | (2006.01) |

(52) U.S. Cl.
CPC ..... *H04L 9/3247* (2013.01); *G06Q 10/06395* (2013.01); *H04L 9/0819* (2013.01)

(58) Field of Classification Search
CPC ............................ H04L 9/3247; H04L 9/0819
See application file for complete search history.

(56) References Cited

U.S. PATENT DOCUMENTS

| | | | | |
|---|---|---|---|---|
| 10,515,205 | B2 * | 12/2019 | Eksten | G06F 21/51 |
| 11,411,816 | B1 * | 8/2022 | Saluja | H04L 63/20 |
| 11,943,371 | B2 * | 3/2024 | Fradkin | H04L 63/102 |
| 12,155,774 | B1 * | 11/2024 | Kurani | G06Q 20/3829 |
| 2008/0104706 | A1 * | 5/2008 | Karp | H04L 63/0428 726/26 |
| 2009/0327739 | A1 * | 12/2009 | Relyea | H04L 63/0876 713/182 |
| 2014/0108805 | A1 * | 4/2014 | Smith | H04L 9/3247 713/176 |
| 2014/0164776 | A1 * | 6/2014 | Hook | G06F 21/6218 713/171 |
| 2015/0033024 | A1 * | 1/2015 | Mashima | H04L 63/123 713/176 |
| 2016/0020907 | A1 * | 1/2016 | Mosko | H04L 63/123 713/176 |
| 2017/0063551 | A1 * | 3/2017 | Quinn | H04L 9/0643 |
| 2017/0250972 | A1 * | 8/2017 | Ronda | H04L 9/0891 |
| 2019/0013934 | A1 * | 1/2019 | Mercuri | G06F 21/602 |
| 2019/0068636 | A1 * | 2/2019 | Wang | H04L 63/06 |
| 2020/0097661 | A1 * | 3/2020 | Block | H04L 9/3271 |

(Continued)

*Primary Examiner* — Wasika Nipa

(74) *Attorney, Agent, or Firm* — WOMBLE BOND DICKINSON (US) LLP

(57) ABSTRACT

Methods and systems for managing trust in data are disclosed. Generated data may be more or less reliable depending on the manner in which the data is generated. To identify a level of trust to have in generated data, information regarding the conditions under which data was generated may be provided along with the generated data. The added information may allow a receiver of the generated data to independently evaluate and ascribe the level of trust to have in the generated data. Different receivers of the same data may use different manners of evaluating the added information depending on their tolerance for risk in use of the generated data.

20 Claims, 6 Drawing Sheets

(56) References Cited

U.S. PATENT DOCUMENTS

2020/0110879 A1* 4/2020 Linton .................. G06F 21/575
2020/0142709 A1* 5/2020 Chew ........................ G06F 1/24
2020/0322075 A1* 10/2020 Bhandari .............. H04J 3/0688
2020/0410105 A1* 12/2020 Allo ...................... G06F 3/0658
2021/0044575 A1* 2/2021 Kong .................... H04L 9/3247
2021/0326442 A1* 10/2021 Campagna ............ H04L 63/067
2021/0406386 A1* 12/2021 Ortiz ...................... G06N 20/00
2022/0108026 A1* 4/2022 Ortiz ................... G06F 12/1441
2022/0158855 A1* 5/2022 Wentz ................... H04L 9/3247
2022/0210164 A1* 6/2022 Lim .................... H04L 63/0435
2022/0255916 A1* 8/2022 Smith ................... H04L 9/3247
2023/0070824 A1* 3/2023 Korwin-Gajkowski ..................... H04W 4/38
2023/0119838 A1* 4/2023 Meyers ................... G06F 21/64 463/42
2023/0122552 A1* 4/2023 Meyers ................... A63F 13/69 463/29
2023/0123993 A1* 4/2023 Meyers ................. H04L 9/3213 705/69
2023/0188732 A1* 6/2023 Völcker ................ H04N 21/835 382/232
2023/0231699 A1* 7/2023 Richarte ............. H04L 63/0428 713/170
2023/0315872 A1* 10/2023 Lally ..................... H04L 9/3239 726/27
2023/0350953 A1* 11/2023 Bruso ................... H04L 9/3252
2024/0323010 A1* 9/2024 Rosu ..................... H04L 9/3263

* cited by examiner

SYSTEM AND METHOD FOR PROVIDING INFORMATION USABLE TO IDENTIFY TRUST IN DATA

FIELD

Embodiments disclosed herein relate generally to trust. More particularly, embodiments disclosed herein relate to systems and methods to identify levels of trust in data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
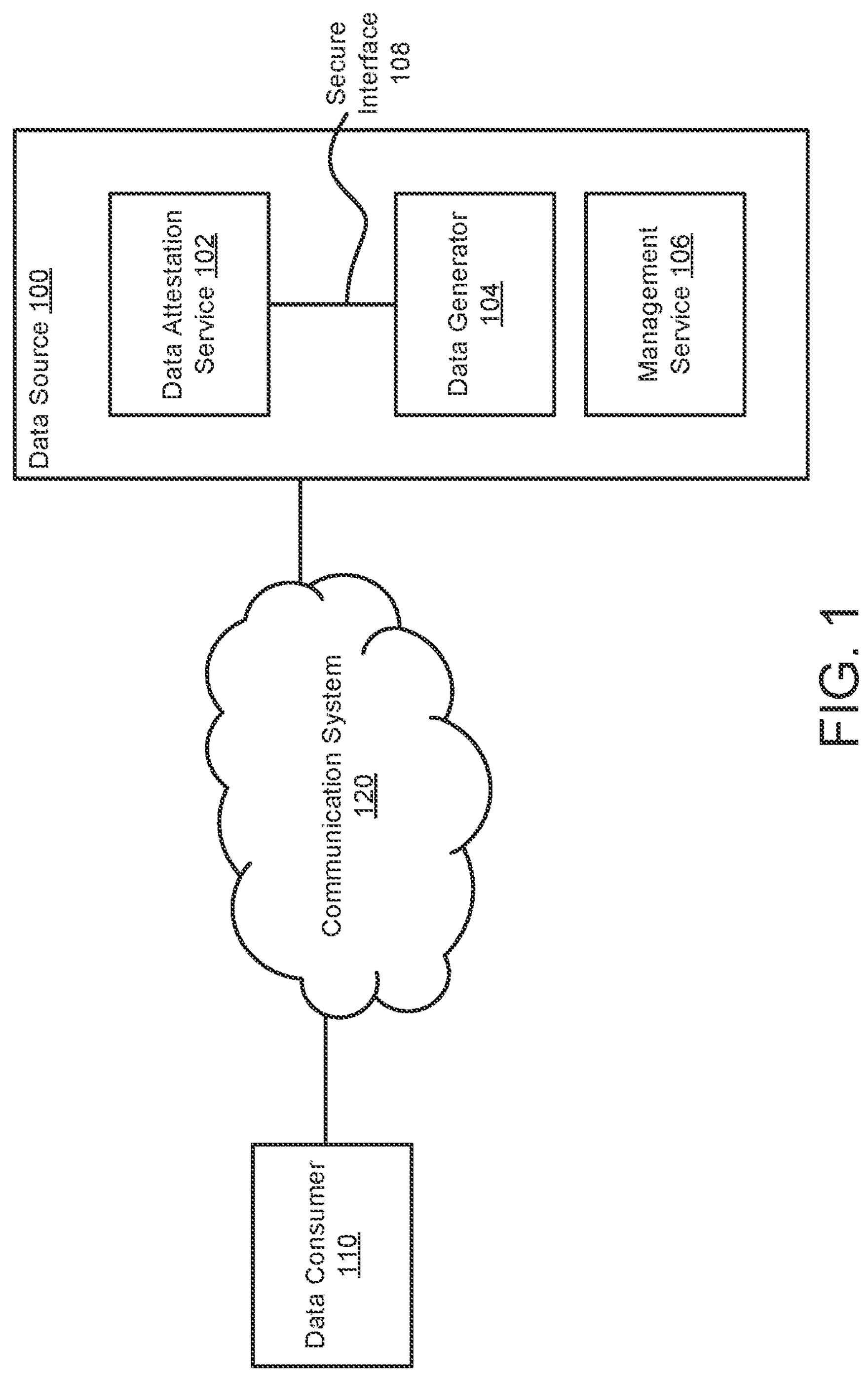
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, various entities device may generate new data and use data from other entities.

Use of data from other entities may present a degree of risk. If the other entities generate the data in certain manners, the data may not be reliable. Consequently, use of the data, if unreliable, may spoil or otherwise negatively impact the computer implemented services provided by an entity.

To manage risk presented by use of data from other entities, a system in accordance with embodiments disclosed herein may facilitate addition of data to generated data usable by other entities to ascribe a level of trust to have in the generated data. The added data may allow receiving entities to identify a user environment, a system environment, and/or other conditions impacting how the generated data was obtained. The receiving entities may ascribe a level of trust in the generated data using various systems keyed to the conditions impacting how the data was generated. Consequently, the systems may allow different entities to ascribe different levels of trust in similar generated data. Accordingly, different receiving entities may hedge risk presented by the generated data to different levels commensurate with their risk tolerance.

By doing so, embodiments disclosed herein may facilitate use of data from various entities while managing the risk presented by the use of the data. Thus, embodiments disclosed herein may address, among others, the technical problem of trust in data in distributed systems where generated data may not be reliable for various purposes depending on how it is generated. To address this technical problem, embodiments disclosed herein may provide for data usable to ascertain conditions under which the data was generated to be obtained. Consequently, receivers of data may independently evaluate the extent of trust to have in data based on these conditions.

In an embodiment, a method for providing data from a data source to a data consumer is disclosed. The method may include generating, by the data source, a portion of the data; providing, by the data source, the portion of the data to an attestation service; modifying, by the attestation service, the portion of the data based on generation information that indicates condition of a system through which the portion of the data was originated to obtain a modified portion of the data; signing, by the attestation service, the modified portion of the data with at least one private key to obtain a signed payload; providing, by the attestation service, the signed payload; and providing, by the data source, the signed payload to the data consumer.

The method may also include attempting, by the data consumer, to verify at least one signature of the signed payload to obtain a first trust indicator; analyzing, by the data consumer, the generation information of the signed payload to obtain a second trust indicator; ascribing, by the data consumer, a level of trust in the portion of the data from the signed payload based on the first trust indicator and the second trust indicator; and providing, by the data consumer, computer implemented services using the portion of the data and the ascribed level of trust.

Modifying the portion of the data based on generation information may include updating of the portion of the data based on a reliable time source.

Modifying the portion of the data based on generation information may also include adding environment information regarding a user environment in which the data generated existing while the portion of the data was generated.

The environmental information may include a hash of a boot disk image from which the data generator was instantiated; a configuration for a host entity; and a configuration for the data generation.

Modifying the portion of the data based on generation information may also include adding an attestation statement indicating that the user environment was hosted by hardware operating in a predetermined manner.

The attestation may be signed by a vendor for the hardware.

Signing the modified portion of the data may include signing the modified portion of the data with a private key of the data generator to obtain a first signed modified portion of the data.

Signing the modified portion of the data may also include signing the first signed modified portion of the data with a private key of a host system that comprises the hardware, the private key being secured by a trusted platform module.

The trusted platform module may prevent signing when the hardware is not operating in the predetermined manner.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, data may be generated and data may be used. For example, data may be shared between different entities that cooperatively and/or independently provide the computer implemented services.

By sharing data between different entities, the computer implemented services provided by a first entity may be impacted by the manner in which data used in the computer implemented services was generated by a second entity. For example, if the second entity generates the data in compromised environment or an undesired manner, then use of the data may negatively impact the computer implemented services provided by the first entity.

However, it may not be possible the first entity to enforce hygiene standards on the second entity for data generation. For example, the second entity may need to comply with other standards for other reasons. Consequently, data from any source may be suspect.

In general, embodiments disclosed herein may provide methods, systems, and/or devices for generating and distributed data to allow consumers of the data to ascribe a level of trust to have in the data. The level of trust in the data may then allow the consumers of the data to decide how to use the data to hedge against risk in use of the data to provide various computer implemented services. As noted above, there may be a level of risk in using any type of data and different entities may need to have different levels of caution depending on the type of computer implemented services that are provided with the data.

To allow the consumers of data to ascribe a level of trust in the data, information regarding the manner in which the data was generated (e.g., "environmental information") may be provided along with the generated data. The data and environmental information may be signed thereby allowing a signed payload to be provided to a consuming entity. The consuming entity may use the environmental information and any signatures from the signed payload to evaluate a level of trust to have in the data in the signed payload. Different consuming entities may use different criteria for ascribing levels of trust to data. Consequently, different consuming entities may ascribe different levels of trust in the same data.

To provide the above noted functionality, the system of FIG. 1 may include data consumer 110 and data source 100. Each of these components is discussed below.

Data consumer 110 may consume data from data source 100 (e.g., more specifically data generated by data generator 104) to provide any number and type of computer implemented services. To consume the data, data consumer 110 may ascribe a level of trust in the consumed data from data generator 104 using information added by data attestation service 102. The extent of use and reliance on the data from data generator 104 in the computer implemented services may be based on the level of trust ascribed to the data.

Data source 100 may (i) generate data usable in computer implemented services (e.g., using data generator 104), (ii) add information regarding the manner in which the data from data generator 104 was generated and/or sign it to obtain signed payloads, (iii) secure communications between data generator 104 and data attestation service 102 (e.g., via management service 106), (iv) provide signed payloads to other entities, and/or provide other functionalities for generating and providing various types of data usable by data consumers. To provide it functionality, data source may include data attestation service 102, data generator 104, and management service 106.

Data generator 104 may be implemented using an application hosted in a user environment such as a virtual machine or container. The application may generate data which may be desired by data consumer 110. The application may generate the data via any method (e.g., through processing, through querying sensors or other devices through which real world data may be obtained, etc.).

Rather than providing the raw generated data, data generator 104 may provide data attestation service 102 with the data, and may receive signed payloads. The signed payloads may then be provided to data consumer 110 and/or other entities.

Data attestation service 102 may (i) amend data from data generator 104 to add information regarding the manner in which the data was generated, and/or (ii) sign the data using one or more keys. The signed amended data may be referred to as a signed payload. Once obtained, signed payloads may be provided back to data generator 104.

Figure 2:
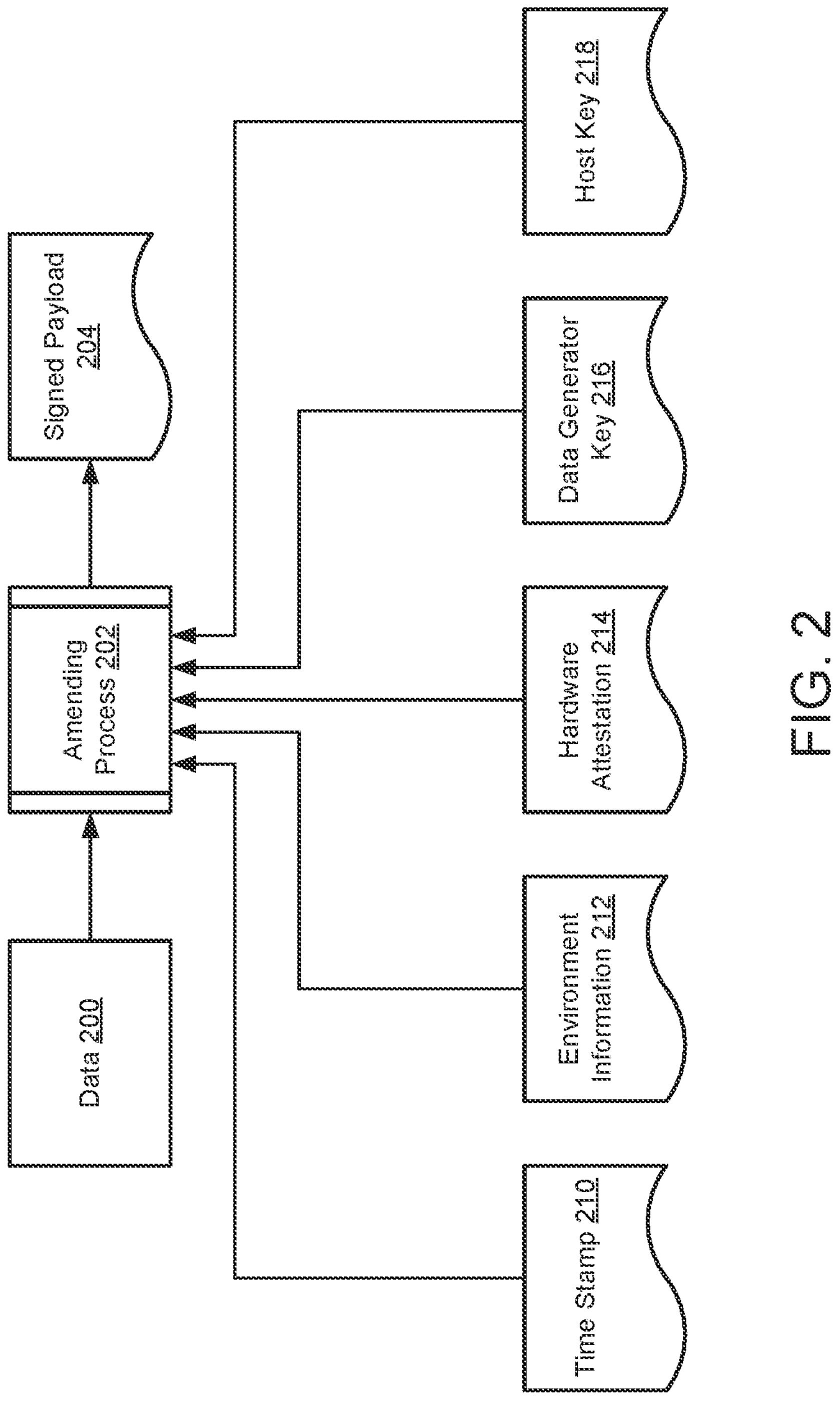
FIG. 2 shows data flow diagrams in accordance with an embodiment.

Refer to FIG. 2 for additional details regarding obtaining signed payloads.

To reduce the likelihood of malicious entities interfering with the processes performed by data generator 104 and data attestation service 102, these entities may be operably connected via secure interface 108. Secure interface 108 may be private path that only allows for data to be transmitted between the user environment in which data generator 104 resides and data attestation service 102. For example, if data generator 104 is implemented using an application hosted by a virtual machine, then a virtual local area network may be established that may secure information transmitted between data generator 104 and data attestation service 102. Accordingly, data attestation service 102 may know that any data received via secure interface 108 came from data generator 104.

Management service 106 may provide the user environment in which data generator 104 resides and/or through which data generator 104 may operably connected to data attestation service 102. For example, in the context of virtualized environments, management service 106 may be implemented in part using a hypervisor which may know which images were used to instantiate data generator 104.

Figure 3A:
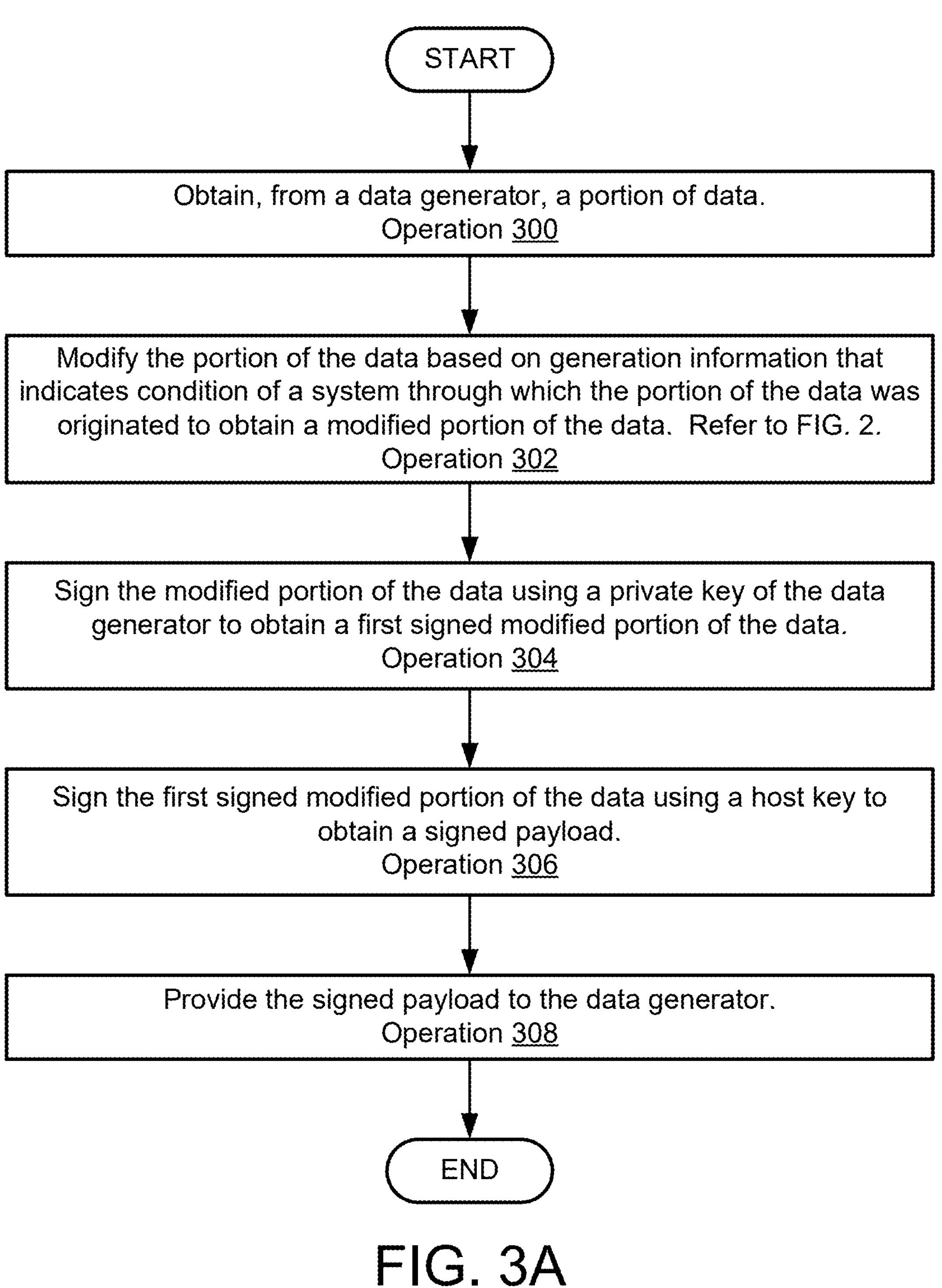
FIG. 3A-3C show flow diagrams illustrating methods in accordance with an embodiment.
Figure 3B:
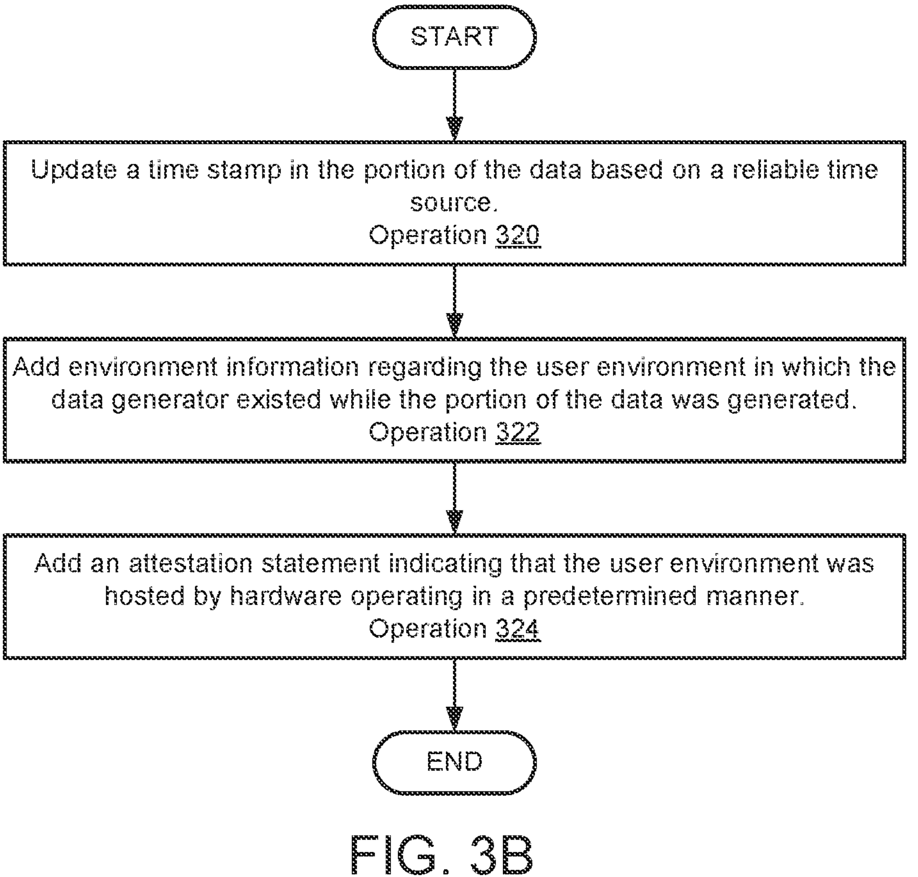
Figure 3C:
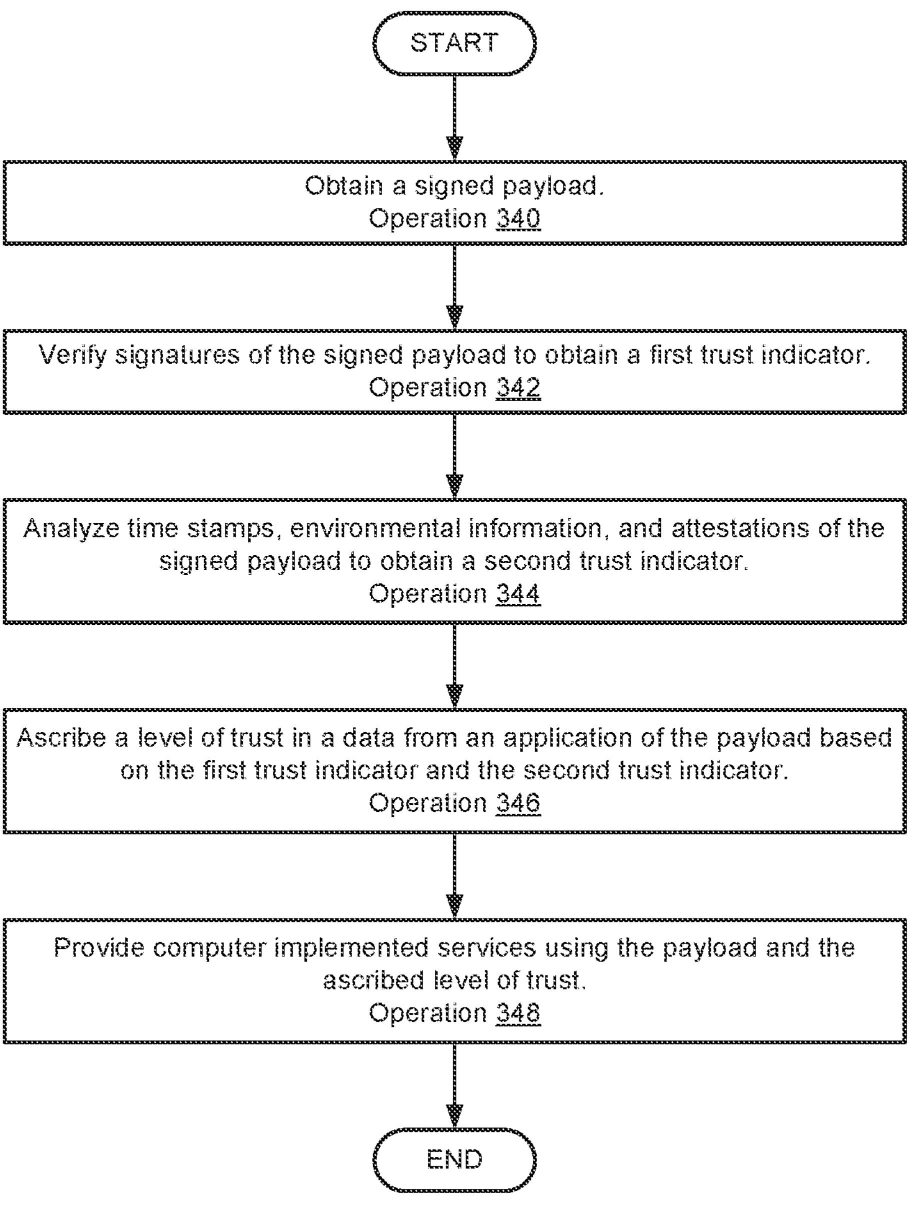

When providing their functionality, any of (and/or components thereof) data consumer 110 and data source 100 perform all, or a portion, of the methods illustrated in FIGS. 3A-3C.

Any of (and/or components thereof) data consumer 110 and/or data source 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol). While described as being separate devices, it will be appreciated that the functionality of data consumer 110 and data source 100 may be implemented using a single computing device.

While illustrated in FIG. 1 as including a limited number of specific components, a system in accordance with an embodiment may include fewer, additional, and/or different components than those illustrated therein.

As discussed above, data attestation service 102 may amend data obtained from data generator 104 to allow other entities to have access to information reflecting the conditions of under which the data was generated. The other entities may use this information to ascertain a level of trust to have in the data.

Turning to FIG. 2, a data flow diagram in accordance with an embodiment is shown. The data flow diagram may illustrate data processing and data flows that may be used to amend data from a data generator.

To amend the data, data 200 may be obtained by the data attestation service. The data may be obtained from a data generator using a secure interface. The secure interface may allow the data attestation service to confirm that the data is from the data generator (as opposed to other entities).

Once obtained, amending process 202 may be performed. During amending process (i) existing portions of the data may be modified, (ii) additional information may be added to the data, and/or (iii) the modified data may be signed using one or more keys.

To modify the existing data, the data attestation service may obtain time stamp 210. Time stamp 210 may be obtained from a trusted source via any process. The trusted source may be, for example, a trusted time service that facilitate time synchronization using a predetermined protocol.

Time stamp 210 may be used to modify an existing time stamp or other time information in data 200. For example, time stamp 210 may replace an existing time stamp in data 200.

To add the additional data, the data attestation service may obtain environment information 212 and hardware attestation 214. Environment information 212 may describe a user environment from which data 200 was obtained. For example, environment information 212 may include (i) a one way result such as a hash of a disk or file system image on which the user environment is based (e.g., image of a virtual machine/container set/etc.), (ii) configuration settings for entities in the user environment such as applications, operating systems, etc., and/or other information usable by another entity to deduce how hosted entities may have generated data 200.

Hardware attestation 214 may be a cryptographically verifiable statement indicating that data 200 was generated by hardware and/or software under secure and proper operation in accordance with one or more standards. For example, the verifiable statement may indicate that a trusted platform module of the hardware of a host system includes a device private key that was generated and sealed in accordance with the standards, and that data signed using the device private key only can come from a host environment by a system provided by a vendor while operating under the secure and proper standards. In other words, hardware attestation 214 may be a statement from a vendor attesting that the hardware of the host system and/or software operates in a manner that ensure the device private key of the trusted platform module may not be used to sign data unless the hardware and/or software operates in accordance with one or more defined standards.

Environment information 212 and hardware attestation 214 may be added to data 200 during amending process 202. The combined data 200 (e.g., as modified based on time stamp 210), environment information 212, and hardware attestation 214 may be referred to as modified data or a modified data package.

To sign the modified data using one or more keys, the data attestation service may use data generator key 216 and/or host key 218. Data generator key 216 may be a private key of data generator 104, and may be obtained by receiving it via the secure interface. Host key 218 may be a private key of the host system (e.g., data source 100). Host key 218 may be, for example, a device attestation key for the host system managed by a trusted platform module of data source 100. Consequently, signing the modified data using host key 218 may indicate to other entities that the host system was operating in a predetermined manner in accordance with a standard enforced by the trusted platform module. In contrast, data generator key 216 may be part of a key pair with a public key being published by a key authority or other entity through which trust may be established. The modified data may be signed using one or both of these keys (and/or other keys). Signing the modified data may result in signed payload 204.

Signed payload 204 may be returned to data generator 104 via secure interface 108. Once returned, data generator 104 may distribute signed payload 204 to other entities or use signed payload 204 for other purposes.

As discussed above, the components of FIG. 1 may perform various methods to facilitate identification of trust that data consumers should have in various data. FIGS. 3A-3C illustrate methods that may be performed by the components of the system of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method for providing data in accordance with an embodiment is shown. The method may be performed by any of data source 100, data consumer 110, and/or other components of the system shown in FIG. 1.

At operation 300, a portion of data is obtained from a data generator. The portion of data may be obtained by receiving it from the data generator via a secure interface. The data generator may have generated the data.

At operation 302, the portion of the data is modified based on generation information that indicates condition of a system through which the portion of the data was originated to obtain a modified portion of the data. The modified portion of the data may include information usable by a data consumer to evaluate a level of trust to have in the portion of the data (which may be included in the modified portion of the data). The modified portion of the data may include, for example, the portion of the data, environmental information (e.g., reflecting conditions of user environments through which the portion of the data is obtained), modified time stamps, and/or one or more attestations (e.g., reflecting a system environment such as condition of hardware and/or software that supports user environments). The modified portion of the data may be obtained via the method shown in FIG. 2.

At operation 304, the modified portion is signed using a private key of the data generator to obtain a first signed modified portion of the data. The modified portion may be signed by (i) obtaining access to a private key of the data generator (e.g., via a secure interface), and (ii) signing the modified portion of the data using the private key.

At operation 306, the first signed modified portion of the data is signed using a host key to obtain a signed payload. The first signed modified portion of the data may be signed using a trusted platform module that safeguards the host key.

At operation 308, the signed payload is provided to the data generator. The signed payload may be provided to the data generator by sending it via a secure interface to the data generator.

The method may end following operation 308.

Following operation 308, the data generator may provide the signed payload to other entities. The other entities may then use the environment information and signatures to ascribe a level of trust for the portion of the data included in the signed payload. Refer to FIG. 2 for additional details regarding ascribing trust in data.

Turning to FIG. 3B, a flow diagram illustrating a method for modifying a portion of data in accordance with an embodiment is shown. The method may be performed by any of data source 100, data consumer 110, and/or other components of the system shown in FIG. 1.

At operation 320, a time stamp in the portion of the data is updated based on a reliable time source. The time stamp may be updating by obtaining a time synchronization with the time source, identifying when the portion of the data was generated using the synchronized time, and replacing a time stamp in the portion of the data with when the portion of the data was generated using the synchronized time. The reliable time source may be, for example, a local source (e.g., a nuclear clock), a remote source (e.g., a time server), or any other source which is trusted by the data attestation service.

At operation 322, environment information regarding the user environment in which the data generator existed while the portion of the data was generated may be added. The environment information may include details of the user environment in which the portion of the data was generated. The environment information may include a one way result of disk images used to establish the user environment, configuration settings for the user environment, etc. The environment information may be appended to (and/or otherwise combined with) the portion of the data.

At operation 324, an attestation statement indicating that the user environment was hosted by hardware operating in a predetermined manner is added. The attestation statement may be from a vendor of the data source. The attestation statement may be cryptographically signed. The attestation statement may also, for example, indicate that software hosted by the hardware was operating in a predetermined manner as well. The attestation statement may be signed by a vendor or another entity.

The method may end following operation 324.

Thus, using the methods illustrated in FIGS. 3A-3B, embodiments disclosed herein may facilitate generation of data that includes information with which other entities may ascribe a level of trust in the data based on the manner in which the data was generated.

Turning to FIG. 3C, a flow diagram illustrating a method for using data in accordance with an embodiment is shown. The method may be performed by any of data source 100, data consumer 110, and/or other components of the system shown in FIG. 1.

At operation 340, a signed payload is obtained. The signed payload may be obtained by receiving it from a data generator.

At operation 342, signatures of the signed payload are verified to obtain a first trust indicator. The signatures may be verified using public keys corresponding to the private keys used to generate the signatures. The trust indicator may be based on whether the signatures can be successfully verified using the public keys.

The first trust indicator may be a numerical rating or other quantification for trust in the signed payload. The numerical rating may be assigned using a rating system that assigns different ratings based on which and how many signatures can be verified.

At operation 344, time stamps, environmental information, and/or attestations of the signed payload are analyzed to obtain a second trust indicator.

The environmental information may be analyzed by identifying a level of comfort in the user environment indicated by the environment information. The level of comfort may be identified by performing a lookup for different user environments. The lookup may return the level of comfort. The level of comfort for different user environments may be established by a subject matter expert.

The attestations may be analyzed by identifying a level of comfort in the host environment indicated by the attestations. The level of comfort may be identified by performing a lookup for different host environments and/or the entity that signed the attestation. The lookup may return the level of comfort. The level of comfort for different host environments and/or attestors may be established by a subject matter expert.

The second trust indicator may be a numerical rating or other quantification for trust in the signed payload. The numerical rating may be assigned using a rating system that assigns different ratings based on the levels of comfort and/or any issues present in the time stamp. The rating system may be a functional relationship, a lookup table, etc.

At operation 346, a level of trust in the data from an application of the payload is ascribed based on the first trust indicator and the second trust indicator. The level of trust may be ascribed using a function, a lookup table, and/or other process for computing the level of trust using the trust indicators.

At operation 348, computer implemented services are provided using the payload and the ascribed level of trust. The computer implemented services may be provided by (i) selecting how and the extent of use of the data based on the ascribed level of trust and/or a type of the computer implemented services, and (ii) providing the computer implemented services using the payload to in the manner identified and to the extent limited for the data. The extent of use and manner of user may be identified using a function, a lookup table, and/or other process. For example, a lookup table may provide different types of uses and extents of uses based on different types of computer implemented services and ascribed levels of trust.

The method may end following operation 348.

Using the method illustrated in FIG. 3C, embodiment disclosed herein may facilitate management of use of data in computer implemented services based on ascribed level of trust in the data and type of computer implemented services. Custom sets of rules may be used to guide the management there by allowing different entities to manage similar data differently based on their own levels of risk tolerance.

Figure 4:
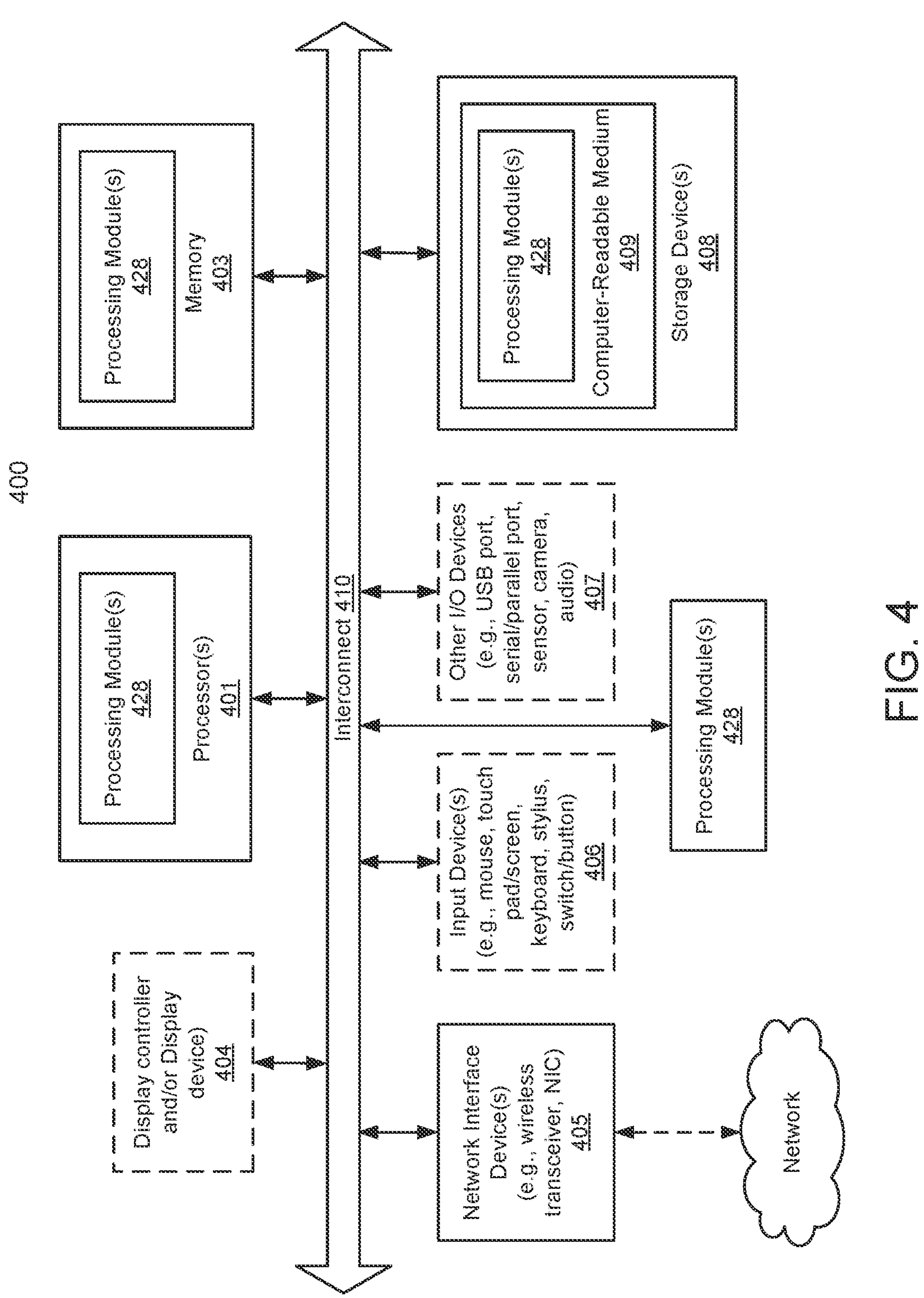
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi® transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term “computer-readable storage medium” should be taken to include a single medium or multiple media (e.g., a centralized or distributed database, and/or associated caches and servers) that store the one or more sets of instructions. The terms “computer-readable storage medium” shall also be taken to include any medium that is capable of storing or encoding a set of instructions for execution by the machine and that cause the machine to perform any one or more of the methodologies of embodiments disclosed herein. The term “computer-readable storage medium” shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory (“ROM”), random access memory (“RAM”), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing data from a data source to a data consumer that requested the data, the method comprising:

generating, by a data generator at the data source, a portion of the data;

providing, by the data generator at the data source, the portion of the data to an attestation service at the data source that attests the portion of the data, the data generator and the attestation service being operably connected via a secure interface through which the portion of the data is provided from the data generator to the attestation service;

modifying, by the attestation service, the portion of the data based on generation information that indicates condition of a system through which the portion of the data was originated to obtain a modified portion of the data, the generation information comprising at least configuration settings of a computing device making up the data source;

signing, by the attestation service, the modified portion of the data with at least one private key to obtain a signed payload, the modified portion of the data being attested by the attestation service upon signing of the modified portion of the data by the attestation service;

providing, by the attestation service, the signed payload back to the data generator via the secure interface; and providing, by the data source, the signed payload directly to the data consumer that requested the data, the data consumer being different from the data source.

2. The method of claim 1, further comprising:

attempting, by the data consumer, to verify at least one signature of the signed payload to obtain a first trust indicator;

analyzing, by the data consumer, the generation information of the signed payload to obtain a second trust indicator;

ascribing, by the data consumer, a level of trust in the portion of the data from the signed payload based on the first trust indicator and the second trust indicator; and providing, by the data consumer, computer implemented services using the portion of the data and the ascribed level of trust.

3. The method of claim 2, wherein modifying the portion of the data based on the generation information comprises:

updating of the portion of the data based on a reliable time source.

4. The method of claim 3, wherein modifying the portion of the data based on the generation information further comprises:

adding environment information regarding a user environment in which the data generated existed while the portion of the data was generated.

5. The method of claim 4, wherein the environment information comprises:

a hash of a boot disk image from which the data generator was instantiated;

a configuration for a host entity; and a configuration for the data generation.

6. The method of claim 5, wherein modifying the portion of the data based on the generation information further comprises:

adding an attestation statement indicating that the user environment was hosted by hardware operating in a predetermined manner.

7. The method of claim 6, wherein the attestation statement is signed by a vendor for the hardware.

8. The method of claim 7, wherein signing the modified portion of the data comprises:

signing the modified portion of the data with a private key of the data generator to obtain a first signed modified portion of the data.

9. The method of claim 8, wherein signing the modified portion of the data further comprises:

signing the first signed modified portion of the data with a private key of a host system that comprises the hardware, the private key being secured by a trusted platform module.

10. The method of claim 9, wherein the trusted platform module prevents signing when the hardware is not operating in the predetermined manner.

11. A non-transitory machine-readable medium having instructions stored therein, which when executed by a processor, causes the processor to perform operations for providing data from a data source to a data consumer that requested the data, the operations comprising:

generating, by a data generator at the data source, a portion of the data;

providing, by the data generator at the data source, the portion of the data to an attestation service at the data source that attests the portion of the data, the data generator and the attestation service being operably connected via a secure interface through which the portion of the data is provided from the data generator to the attestation service;

modifying, by the attestation service, the portion of the data based on generation information that indicates condition of a system through which the portion of the data was originated to obtain a modified portion of the data, the generation information comprising at least configuration settings of a computing device making up the data source;

signing, by the attestation service, the modified portion of the data with at least one private key to obtain a signed payload;

providing, by the attestation service, the signed payload back to the data generator via the secure interface; and providing, by the data source, the signed payload to the data consumer that requested the data, the data consumer being different from the data source.

12. The non-transitory machine-readable medium of claim 11, wherein modifying the portion of the data based on the generation information comprises:

updating of the portion of the data based on a reliable time source.

13. The non-transitory machine-readable medium of claim 12, wherein modifying the portion of the data based on the generation information further comprises:

adding environment information regarding a user environment in which the data generated existed while the portion of the data was generated.

14. The non-transitory machine-readable medium of claim 13, wherein the environment information comprises:

a hash of a boot disk image from which the data generator was instantiated;

a configuration for a host entity; and a configuration for the data generation.

15. The non-transitory machine-readable medium of claim 14, wherein modifying the portion of the data based on the generation information further comprises:

adding an attestation statement indicating that the user environment was hosted by hardware operating in a predetermined manner.

16. The non-transitory machine-readable medium of claim 15, wherein the attestation statement is signed by a vendor for the hardware.

17. The non-transitory machine-readable medium of claim 16, wherein signing the modified portion of the data comprises:

signing the modified portion of the data with a private key of the data generator to obtain a first signed modified portion of the data.

18. A data processing system, comprising:

a processor; and a memory coupled to the processor to store instructions, which when executed by the processor, cause the processor to perform operations for providing data from a data source to a data consumer that requested the data, the operations comprising:

generating, by a data generator at the data source, a portion of the data;

providing, by the data generator at the data source, the portion of the data to an attestation service at the data source that attests the portion of the data, the data generator and the attestation service being operably connected via a secure interface through which the portion of the data is provided from the data generator to the attestation service;

modifying, by the attestation service, the portion of the data based on generation information that indicates condition of a system through which the portion of the data was originated to obtain a modified portion of the data, the generation information comprising at least configuration settings of a computing device making up the data source;

signing, by the attestation service, the modified portion of the data with at least one private key to obtain a signed payload;

providing, by the attestation service, the signed payload back to the data generator via the secure interface; and providing, by the data source, the signed payload to the data consumer that requested the data, the data consumer being different from the data source.

19. The method of claim 1, wherein the secure interface is configured as a private path between the data generator and the attestation service, the private path being configured to allow transmission of data between only the data generator and the attestation service such that the attestation service knows that any data received via the private path comes directly from the data generator.

20. The method of claim 19, wherein the data generator is hosted at the data source as a virtual machine or a container, and the data source further comprises a management service that facilitates establishment of the secure interface between the data generator and the attestation service by providing the attestation service with first information that indicates whether the data generator is hosted as the virtual machine or the container and second information that indicates a computing environment of the data source in which the virtual machine or the container resides.

* * * * *